(12) United States Patent
Petrisor et al.

(10) Patent No.: US 8,471,698 B2
(45) Date of Patent: Jun. 25, 2013

(54) PLUGGABLE RADIO NAVIGATION SATELLITE SYSTEM STREET LIGHT CONTROLLER

(76) Inventors: Gregory C. Petrisor, Los Angeles, CA (US); Ryan A. Perdue, Venice, CA (US)

( * ) Notice: Subject to any disclaimer, the term of this patent is extended or adjusted under 35 U.S.C. 154(b) by 827 days.

(21) Appl. No.: 12/226,265

(22) PCT Filed: Mar. 22, 2007

(86) PCT No.: PCT/US2007/007073
§ 371 (c)(1),
(2), (4) Date: Oct. 14, 2008

(87) PCT Pub. No.: WO2007/126662
PCT Pub. Date: Nov. 8, 2007

(65) Prior Publication Data
US 2010/0013608 A1    Jan. 21, 2010

Related U.S. Application Data

(60) Provisional application No. 60/793,549, filed on Apr. 20, 2006.

(51) Int. Cl.
| | |
|---|---|
| G08B 1/08 | (2006.01) |
| G08B 1/00 | (2006.01) |
| G08B 13/14 | (2006.01) |
| G08B 21/00 | (2006.01) |
| G05B 11/01 | (2006.01) |
| G08C 19/12 | (2006.01) |
| G01S 19/42 | (2010.01) |
| G01S 1/08 | (2006.01) |

(52) U.S. Cl.
USPC ............... 340/539.13; 340/12.27; 340/13.25; 340/309.4; 340/572.1; 340/572.8; 340/686.1; 342/357.25; 342/386

(58) Field of Classification Search
USPC ........................................ 340/310.11, 539.13
See application file for complete search history.

(56) References Cited

U.S. PATENT DOCUMENTS

| | | | |
|---|---|---|---|
| 4,691,341 A | | 9/1987 | Knoble et al. |
| 5,990,826 A | * | 11/1999 | Mitchell ................. 342/357.64 |
| 6,259,215 B1 | * | 7/2001 | Roman ........................ 315/307 |
| 6,452,339 B1 | | 9/2002 | Morrissey et al. |
| 6,791,284 B1 | | 9/2004 | Levy |
| 7,659,676 B2 | * | 2/2010 | Hwang ........................ 315/360 |
| 2005/0054292 A1 | | 3/2005 | Janusz et al. |

\* cited by examiner

*Primary Examiner* — Jennifer Mehmood
*Assistant Examiner* — John Mortell
(74) *Attorney, Agent, or Firm* — Scot A. Reader

(57) ABSTRACT

An RNSS based street light controller pluggable into a standard electrical interface of a street light for drawing power and controlling a lamp of the street light eliminates the need for photosensors, wiring terminals and related components and yields a street light controller with modest installation and configuration requirements and robust performance and failure recovery characteristics. In some embodiments, the RNSS based street light controller comprises an RNSS receiver, a first electrical interface and a lamp controller, wherein the first electrical interface is adapted to couple with a second electrical interface of a street light and the lamp controller is adapted to regulate a supply of power to a lamp of the street light via the first electrical interface based at least in part on information received by the RNSS receiver.

15 Claims, 3 Drawing Sheets

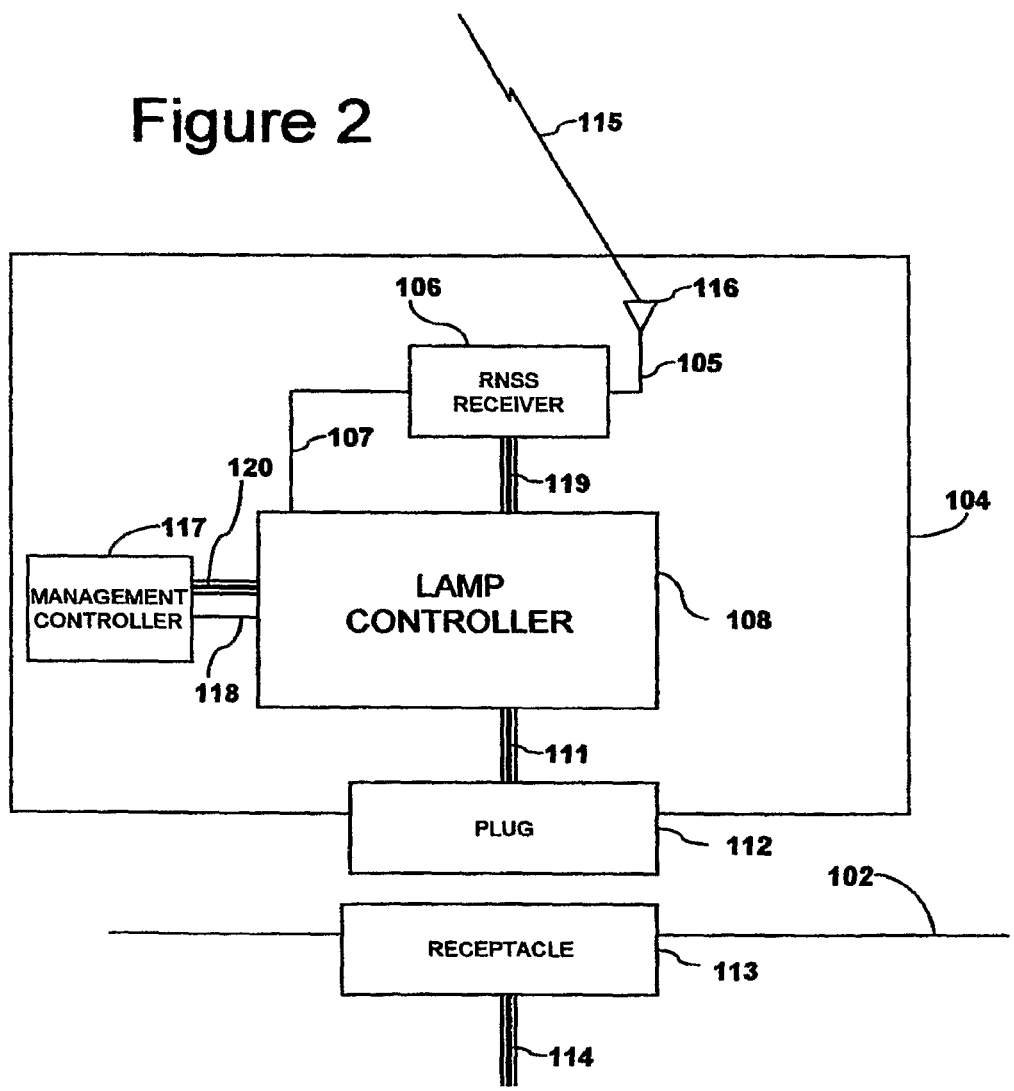

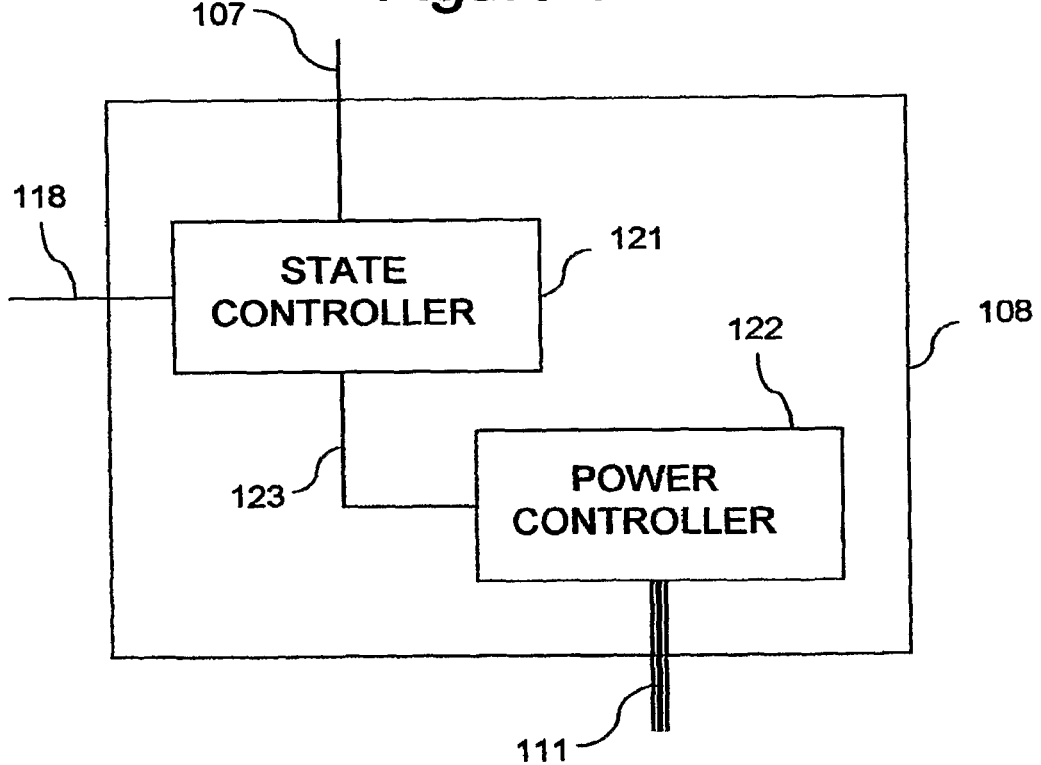

PLUGGABLE RADIO NAVIGATION SATELLITE SYSTEM STREET LIGHT CONTROLLER

CROSS-REFERENCE TO RELATED APPLICATION

This application claims the benefit of U.S. provisional application No. 60/793,549 entitled "Pluggable Radio Navigation Satellite System Street Light Controller," filed on Apr. 20, 2006.

BACKGROUND OF THE INVENTION

The present invention relates to an improved controller for street light applications, and more particularly to a radio navigation satellite system (RNSS) based street light controller that is adapted to be powered by a street light and control a street light lamp using a standard electrical interface on the street light.

Street light controllers are used throughout the world to control the operation of street light lamps. Desired properties of a street light controller include turning the lamp on nominally around dusk and turning the lamp off nominally around dawn. Variants of this control cycle that turn the lamp off at a predetermined time, such as midnight, are also known.

Many known street light controllers are photosensor based. Photosensor based street light controllers turn the street light lamp on and off based on a level of light detected by photosensors associated with the controller. More particularly, the controller turns the lamp off in response to the presence of sufficient light and turns the lamp on in response to the absence of sufficient light.

Photosensor based street light controllers experience a variety of problems. One is false positives. Light flashes detected by photosensors from, for example, stray automobile headlights or lightning can cause the lamp to turn off inadvertently. Once in the off state the lamp often remains there for a substantial time that depends on the restrike characteristics of the street lamp. Additionally, photosensor false positives reduce the life of the lamp due to the increased number of restrikes thereby increasing street light failure rates and total cost of ownership. Another problem is orientation. Photosensor based street lights must generally be positioned to capture ambient light and to meet other requirements of the application, topography and photosensor type. Another problem is drift. Photosensor based street light controllers often experience drift due to photo cell aging that causes lamp on/off times to deviate from schedule. High heat in photo cells often accelerates drift. Yet another problem is atmospheric conditions. Atmospheric conditions such as pollution and cloud cover often affect performance of photosensors. Moreover, different photosensor types react to atmospheric conditions differently. For example, Si photosensors are extremely sensitive to infrared light which often necessitates installation of infrared blocking glass filters in conjunction with such photosensors. Yet another problem is night control. Electronic timers or secondary switching mechanisms must generally be employed in applications that require photosensor based street lights to be turned off during the night. Yet another problem is hysteresis. Photosensor based street light controllers must generally account for the effects of hysteresis in order to accurately coordinate on/off state with dusk and dawn. Yet another problem is power draw. Photosensors consume substantial power which proves expensive over the life span of the street light controller.

Despite these problems, photosensor based street light controllers are popular because they have a generally low upfront cost, require little user configuration, conform to industry standard form factors for street lights and are adapted to be plugged into an American National Standards Institute (ANSI) standard electrical interface configured on most street lights. These characteristics have generally enabled photosensor based street light controllers to be deployed on a one-per-light basis, which has simplified street light wiring, and enabled plug-and-play replacement in the event of failure. It would therefore be desirable to reduce problems associated with photosensor based street light controllers while maintaining positive characteristics of these controllers.

Meanwhile, it is known to use RNSS receivers, such as global positioning system (GPS) receivers, in street light control systems. In known RNSS based street light control systems, the GPS receiver generally does not conform to a standard form factor for individual street lights but rather is adapted for mounting to a pole to control multiple street lights simultaneously. Known RNSS based street light control systems are not pluggable into the ANSI-standard electrical interface configured on most street lights but instead rely on wiring terminals for electrical connectivity with multiple street lights. Moreover, since a single controller is adapted to control a large number of street lights, a system-wide failure occurs if the controller fails. Furthermore, known RNSS based street light control systems typically require significant user input to obtain desired configuration and operation.

SUMMARY OF THE INVENTION

The present invention, in a basic feature, provides an RNSS based street light controller that is pluggable into a standard electrical interface of a street light for drawing power and controlling a lamp of the street light. Through judicious integration of an RNSS receiver into a street light controller that is pluggable into a standard electrical interface of the street light, the need for photosensors, wiring terminals and related components is eliminated, yielding a street light controller with modest installation and configuration requirements but robust performance and failure recovery characteristics.

In some embodiments, an RNSS based street light controller comprises an RNSS receiver, a first electrical interface and a lamp controller, wherein the first electrical interface is adapted to couple with a second electrical interface of a street light and the lamp controller is adapted to regulate a supply of power to a lamp of the street light via the first electrical interface based at least in part on information received by the RNSS receiver. The street light controller may also be adapted to draw power via the first electrical interface. The lamp controller may be further adapted to regulate the supply of power to the lamp via the first electrical interface based at least in part on an operative power regulation policy. The RNSS receiver may comprise a GPS receiver. The second electrical interface may comprise an ANSI-compliant receptacle.

In some embodiments, an RNSS based street light controller comprises an RNSS receiver, a pluggable electrical interface, a power controller adapted to control a supply of power to a lamp of a street light via the pluggable electrical interface based at least in part on a state of the power controller and a state controller coupled to the RNSS receiver and the power controller and adapted to control the state of the power controller based at least in part on information received from the RNSS receiver. The street light controller may also be adapted to draw power through the pluggable electrical interface. The state controller may be adapted to control the power controller further based at least in part on an operative power regulation policy. The RNSS receiver may comprise a GPS receiver. The pluggable electrical interface may be adapted to couple with an ANSI-compliant receptacle. The power controller may comprise an AC or DC switch. The state controller may control the power controller by issuing one or more commands to the power controller. The commands issued by the state controller may include one or more of "on", "off" or power level commands generated based at least in part on information received from the RNSS receiver.

In another aspect, a method for controlling a lamp of a street light comprises the steps of plugging into an electrical interface of the street light, receiving power via the electrical interface, receiving RNSS information and regulating a supply of power to the lamp via the electrical interface based at least in part on the RNSS information. The supply of power may be further regulated based at least in part on an operative power regulation policy. The RNSS information may be GPS information. The electrical interface may comprise an ANSI-compliant receptacle.

These and other aspects of the invention will be better understood by reference to the following detailed description taken in conjunction with the drawings that are briefly described below. Of course, the invention is defined by the appended claims.

BRIEF DESCRIPTION OF THE DRAWINGS

FIG. 2 shows a street light controller in one embodiment of the invention.

FIG. 3 shows a lamp controller in one embodiment of the invention.

DETAILED DESCRIPTION OF A PREFERRED EMBODIMENT

Figure 1:
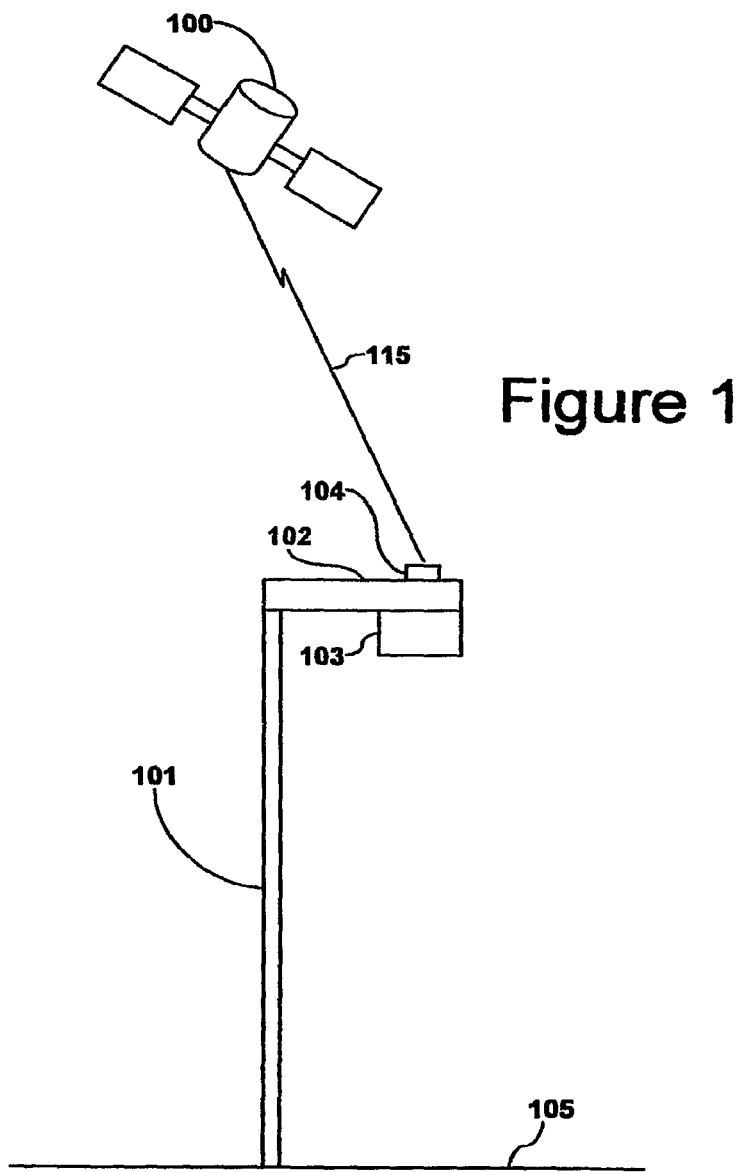
FIG. 1 shows a street light having a street light controller in one embodiment of the invention.

FIG. 1 shows a street light having a pluggable RNSS based street light controller 104 in one embodiment. The street light includes a street light post 101 mounted to and extending generally vertically from the ground 105. A street light arm 102 extends generally horizontally from the top of post 101. Projecting downward from arm 102 is a street light lamp 103. Lamp 103 is powered by grid power delivered from ground 105 via post 101 and arm 102 and is controlled by street light controller 104 at least in part based on signals 115 received from one or more RNSS satellites 100 as hereinafter explained.

FIG. 2 shows street light controller 104 in more detail. Street light controller 104 draws power through an electrical plug 112 that is removably coupleable via a pluggable electrical interface with an electrical receptacle 113 of street light arm 102. Receptacle 113 is coupled to a street light conductor 114 that delivers grid power from ground 105 via post 101 and arm 102. In some embodiments, receptacle 113 is compliant with ANSI standard C136.10 for roadway lighting equipment. Plug 112 is coupled to an internal conductor 111 that is coupled at the other end to a lamp controller 108, which delivers power to an RNSS receiver 106 and a management controller 117 of street light controller 104 via conductors 119 and 120. Lamp controller 108 also controls the supply of power to lamp 103 through plug 112 based on a present state of lamp controller 108 as hereinafter explained.

Street light controller 104 includes a RNSS antenna 116 which receives signals 115 from one or more RNSS satellites 100. RNSS antenna 116 is coupled to RNSS receiver 106 through an antenna coupling conductor 105. Lamp controller 108 receives position and time information from RNSS receiver 106 through an RNSS interface 107. In some embodiments, the RNSS components described herein are GPS components and the RNSS information described herein is GPS information. In some embodiments, lamp controller 108 also receives inputs from and issues status to management controller 117 through a management interface 118. Management controller 117 may, for example, monitor operational status of street light controller 104 for fault reporting purposes.

FIG. 3 shows lamp controller 108 in more detail. Lamp controller 108 includes state controller 121 which determines a desired state for a power controller 122 based on information from RNSS receiver 106 and an operative power regulation policy. State controller 121 sends control signals to power controller 122 through a command interface 123 that cause power controller 122 to assume a desired switch state, for example, "on" or "off". Power controller 122 in turn regulates the supply of power to street light lamp 103 based on the desired switch state, for example, turns lamp 103 "on" or "off". In some embodiments, power controller 122 comprises one of an AC or DC switch or power controller.

In determining a desired switch state, state controller 121 determines a global time (e.g. GMT, UTC) and date from time information received from RNSS receiver 106. In some embodiments, state controller 121 then applies position information received from RNSS receiver 106 and the global time and date to determine the current local time and date. In some embodiments, state controller 121 applies position information received from RNSS receiver 106 and the global time and date to determine the time of local sunrise and/or sunset. With the operative power regulation policy and, in some embodiments the current local time and date and, in some embodiments the time of local sunrise and sunset at hand, state controller 121 can determine a desired switch state and issue appropriate commands to power controller 122.

State controller 121 transmits control signals to power controller 122 through command interface 123. Power controller 122, using information in the control signals, regulates the supply of power to street light lamp 103 via conductors 111, 114. Execution of commands received from state controller 121 may be immediate or delayed. For example, control signals received from state controller 121 may immediately cause power controller 122 to turn lamp 103 on or off. Or control signals may set a timer on power controller 122 that is used by power controller 122 to turn lamp 103 on or off after a desired delay.

As mentioned, state controller 121 applies an operative power regulation policy to determine a desired switch state. A power regulation policy may be executed using software or firmware and may include, for example, a dusk-to-dawn variant for street light or security light applications in which street light lamp 103 turns on at local sunset and turns off at local sunrise; a past night control variant in which street light lamp 103 turns on at local sunset and turns off at local midnight; or a business day variant in which street light lamp 103 remains on during business hours, for example, from 7:00 a.m. to local sunrise and from local sunset to 9:00 p.m. Monday through Friday. A power regulation policy may be preconfigured on state controller 121 by the manufacturer or may be rendered operative and inoperative in the field through commands received from management controller 117, for example. In some embodiments, management controller 117 has a wireless interface allowing remote configuration of state controller 121, for example, to render a power regulation policy operative or inoperative and permit remote download from management controller 117 of information on the operational status of street light controller 104.

The logical components of street light controller 104 described herein may be implemented in custom logic, such as ASICs; general purpose logic, such as software programs implemented by general purpose processors; firmware, or a combination thereof. It will be appreciated that due to the static disposition of RNSS receiver 106, logic requirements for RNSS receiver 106 are advantageously reduced relative to RNSS receivers for mobile applications. One requirement of RNSS receiver 106 is high sensitivity to enable urban canyon reception. The fact that RNSS receiver 106 is static in its location enables additional degrees of freedom in terms of increasing sensitivity of RNSS receiver 106. Meanwhile, several requirements important to RNSS receivers for mobile applications, including time to first fix, location accuracy and velocity accuracy, have decreased significance, which substantially reduces logic requirements for RNSS receiver 106.

It will also be appreciated by those of ordinary skill in the art that the invention can be embodied in other specific forms without departing from the spirit or essential character hereof. The present description is therefore considered in all respects to be illustrative and not restrictive. The scope of the invention is indicated by the appended claims, and all changes that come within the meaning and range of equivalents thereof are intended to be embraced therein.

What is claimed is:

1. A street light controller, comprising:
a radio navigation satellite system (RNSS) receiver;
a first electrical interface; and
a lamp controller,
wherein the first electrical interface is adapted to couple with a second electrical interface of a street light and the lamp controller is adapted to regulate a supply of power to a lamp of the street light via the first electrical interface based at least in part on time information and position information received from the RNSS receiver, wherein the street light controller is adapted to draw power via the first electrical interface and wherein the first electrical interface comprises a plug.

2. The street light controller of claim 1, wherein the lamp controller is adapted to regulate the supply of power to the lamp via the first electrical interface based at least in part on an operative power regulation policy.

3. The street light controller of claim 1, wherein the second electrical interface comprises a receptacle compliant with an American National Standards Institute (ANSI) standard for roadway lighting equipment.

4. The street light controller of claim 1, wherein the RNSS receiver is a global positioning system (GPS) receiver.

5. The street light controller of claim 1, wherein the lamp controller comprises one of an AC and DC switch.

6. A street light controller, comprising:
an RNSS receiver;
a pluggable electrical interface;
a power controller adapted to control a supply of power to a lamp of a street light via the pluggable electrical interface based at least in part on a state of the power controller; and
a state controller coupled to the RNSS receiver and the power controller and adapted to control the state of the power controller based at least in part on time information and position information received from the RNSS receiver, wherein the street light controller is adapted to draw power via the pluggable electrical interface.

7. The street light controller of claim 6, wherein the state controller is adapted to control the power controller based at least in part on an operative power regulation policy.

8. The street light controller of claim 6, wherein the RNSS receiver comprises a GPS receiver.

9. The street light controller of claim 6, wherein the pluggable electrical interface is adapted to couple with a receptacle compliant with an ANSI standard for roadway lighting equipment.

10. The street light controller of claim 6, wherein the power controller comprises one of an AC and DC switch.

11. The street light controller of claim 6, wherein the state controller controls the state of the power controller by issuing one or more commands to the power controller.

12. A method for controlling a lamp of a street light, comprising the steps of:
plugging a street light controller into an electrical interface of the street light;
receiving by the street light controller power via the electrical interface;
receiving by the street light controller RNSS time information and RNSS position information; and
regulating by the street light controller a supply of power to the lamp via the electrical interface based at least in part on the RNSS time information and RNSS position information.

13. The method of claim 12, wherein the supply of power is further regulated based at least in part on an operative power regulation policy.

14. The method of claim 12, wherein the RNSS time and position information comprises GPS time and position information.

15. The method of claim 12, wherein the electrical interface comprises a receptacle compliant with an ANSI standard for roadway lighting equipment.

* * * * *